Patented Mar. 23, 1954

2,672,681

UNITED STATES PATENT OFFICE 2,672,681

METHOD OF SOFT SOLDERING MAGNESIUM

Paul Klain, Midland, Mich., assignor to The Dow Chemical Company, Midland, Mich., a corporation of Delaware No Drawing. Application February 16, 1950, Serial No. 144,585

7 Claims. (Cl. 29—360)

The invention relates to soldering. It more particularly concerns improvements in soft soldering magnesium and the magnesium-base alloys.

Magnesium and the magnesium-base alloys, especially those containing upwards of 80 per cent of magnesium, are very difficult, if not impossible, to soft solder satisfactorily by conventional procedures. It is the principal object of the invention to facilitate soft soldering of magnesium and the magnesium-base alloys.

I have discovered that soft soldering of articles of magnesium and the magnesium-base alloys is readily accomplished by the usual soldering procedures if as a flux there be used at least one of the agents: benzoic acid, benzoic acid anhydride, ar-monochlorobenzoic acid, 2,5-dichlorobenzoic acid, and 2,5-dibromobenzoic acid. Mixtures of these agents may also be used. A particularly desirable mixture I prefer to use is 90 parts of benzoic acid anhydride mixed with 10 parts of benzoic acid. Of the single agents, benzoic acid anhydride is generally most satisfactory because its low volatility results in less fuming.

In carrying out the invention, the parts to be soldered first are preferably cleaned as by wire brushing, sand papering, or acid pickling so as to expose clean metal unless the surfaces are already substantially free of foreign matter. The parts to be soldered are heated as by a torch or soldering iron and a small amount of at least one of the foregoing agents is applied as the flux as by sprinkling and the solder is also applied either solid or molten, as in the usual soldering practice with other fluxes. The parts are heated to a temperature which will maintain the solder molten in contact with the work for a short time, e. g. 1 to 2 minutes, in the presence of the flux. It is preferable not to heat the work longer than about 3 minutes nor higher than about 100 Fahrenheit degrees above the melting point of the solder. The usual soft solders which may be used melt below about 700° F.

The following metals are examples of soft solders, together with suitable soldering temperatures, although other soft solders may be used:

| Solder Composition | Soldering Temperature |
| --- | --- |
| (1) Cadmium 60%, Zinc 30%, Tin 10% | 475° to 550° F. |
| (2) Cadmium 90%, Zinc 10% | 550° to 600° F. |
| (3) Cadmium 72%, Tin 28% | 400° to 500° F. |
| (4) Cadmium 90%, Tin 10% | 550° to 550° F. |
| (5) Tin 100–60%, Zinc 0–40% | 375° to 550° F. |

In the use of the aforesaid aromatic compounds as a flux in soft soldering magnesium and its alloys according to the invention, I have obtained sound bounding together of parts made of these metals.

After soldering is completed and the work is allowed to cool, the residual flux may be washed off, if desired, with either alcohol or water.

I claim:

1. A method of soft soldering an article of magnesium and its alloys which comprises removing the oxides from the surface of the article and then maintaining in contact with the article to be soldered a molten soft solder in the presence of a flux consisting of at least one member selected from the group consisting of benzoic acid, benzoic acid anhydride, armonochlorobenzoic acid, 2,5-dichlorobenzoic acid, and 2,5-dibromobenzoic acid.

2. A method of soft soldering an article of magnesium and its alloys which comprises removing the oxides from the surface of the article and then maintaining in contact with the article to be soldered a molten soft solder in the presence of a flux consisting of benzoic acid.

3. A method of soft soldering an article of magnesium and its alloys which comprises removing the oxides from the surface of the article and then maintaining in contact with the article to be soldered a molten soft solder in the presence of a flux consisting of benzoic acid anhydride.

4. A method of soft soldering an article of magnesium and its alloys which comprises removing the oxides from the surface of the article and then maintaining in contact with the article to be soldered a molten soft solder in the presence of a mixture consisting of benzoic acid and benzoic acid anhydride.

5. A method of soft soldering an article of magnesium and its alloys which comprises removing the oxides from the surface of the article and then maintaining in contact with the article to be soldered a molten soft solder comprising a cadmium alloy having a melting point below about 700° F. in the presence of a flux consisting of benzoic acid.

6. A method of soft soldering an article of magnesium and its alloys which comprises removing the oxides from the surface of the article and then maintaining in contact with the article to be soldered a molten soft solder comprising a cadmium alloy having a melting point below about 700° F. in the presence of a flux consisting of benzoic acid anhydride.

7. A method of soft soldering an article of magnesium or the magnesium-base alloys which comprises removing the oxides from the surface of the article, heating the article to soldering temperature, applying to the surface to be soldered a flux consisting of benzoic acid and a soft solder in the presence of the flux.

PAUL KLAIN.

References Cited in the file of this patent

UNITED STATES PATENTS

| Number | Name | Date |
|---|---|---|
| 1,280,905 | Von Marter | Oct. 8, 1918 |
| 1,785,115 | Dykstra | Dec. 16, 1930 |
| 2,052,740 | Barber | Sept. 1, 1936 |
| 2,092,191 | Thomas | Sept. 7, 1937 |
| 2,095,335 | Kofke | Oct. 12, 1937 |
| 2,155,307 | Hagemann | Apr. 18, 1939 |
| 2,238,068 | Miller | Apr. 15, 1941 |
| 2,299,166 | Miller | Oct. 20, 1942 |
| 2,474,863 | Rinkenback | July 5, 1949 |

FOREIGN PATENTS

| Number | Country | Date |
|---|---|---|
| 685,028 | France | July 3, 1930 |
| 105,339 | Australia | Oct. 13, 1938 |
| 869,071 | France | Jan. 23, 1942 |

OTHER REFERENCES

Welding Handbook, third edition, page 734, published American Welding Society, 33 West 39th St., New York 18, N. Y.